Sept. 18, 1928.
S. G. BROYLES
HONEY RICK
Filed May 13, 1927
1,685,021
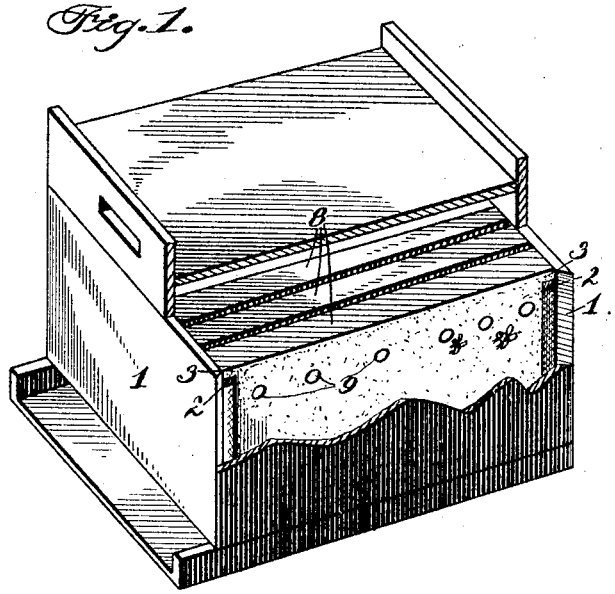
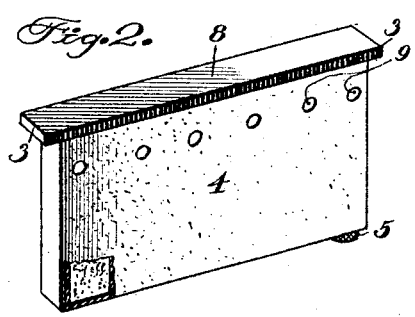
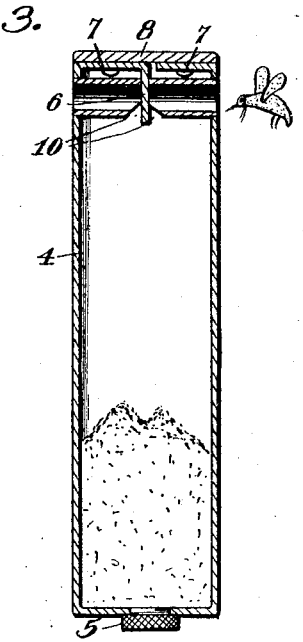
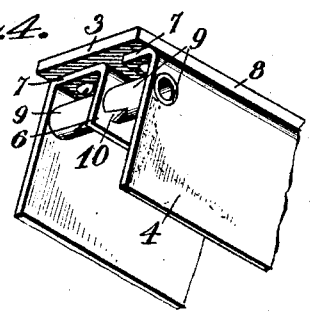
WITNESSES
INVENTOR
S. G. BROYLES
BY
ATTORNEYS Patented Sept. 18, 1928.

1,685,021

UNITED STATES PATENT OFFICE.

SAMUEL G. BROYLES, OF BATTLE MOUNTAIN, NEVADA.

HONEY RICK.

Application filed May 13, 1927. Serial No. 191,138.

This invention relates to the art of bee culture and is more particularly concerned with a novel and particularly advantageous construction of honey depositing rick for use in bee-hive supers in substitution for the usual honeycomb rick.

As at present constructed the comb rick in present day use forces the performance of a great deal of work made unnecessary by the present invention. For instance, with the comb super now in use, after the ricks are constructed and the foundation combs are attached, the bee must build the honey cells, entailing a great amount of time and labor, eliminated by the use of the present invention. Then again, in gathering the honey from these combs, the honey-filled combs must be decapped, the honey extracted by special extractors, and then strained to remove bits of wax or other waste matter. By the use of my invention, this work is made unnecessary.

A feature of my invention resides in a honey depositing rick in which honey deposited by the bees automatically drains into a container, which may be readily drained of its contents and replaced in the super.

A further feature of the invention consists in the provision of a honey depositing rick providing a series of cell-like tubular passages closed at their inner ends and communicating by drain openings with a storage reservoir or container into which the honey deposited by the bees will automatically drain.

These and other features of the invention, including novel structural details, will be more fully apparent from the following detailed specification when read in connection with the accompanying drawings, forming part thereof, and in which Fig. 1 is a perspective view of a hive super showing the use of my depositing rick therein;

Fig. 2 is a perspective of the rick, detached, and with the side broken away;

Fig. 3 is a vertical section through the rick;

Fig. 4 is a fragmentary perspective view showing the construction of the cell tubes, their spacing plate and drains.

The rick forming the subject-matter of the present invention is intended for use in the super or upper removable section of a hive. In Fig. 1 of the drawings I have shown a super having a series of such rick units seated therein, the end of the super being broken away to show the manner in which the rick sections are spaced and supported. As disclosed the side walls 1 of the super are provided with ribs or ledges 2 upon which rest extensions 3 at the ends of the ricks which are appropriately spaced in the super to permit the bees to enter from both sides.

The present invention presents a rick of novel construction and arrangement and in one preferred embodiment provides a flat rectangular metal container, generically designated at 4 and preferably formed of aluminum. The base of the container, which is closed, is provided with a honey draining aperture appropriately closured as at 5 and preferably located adjacent to one end to permit complete drainage.

The upper end of the container is provided with a centrally located transversely extending partition wall 6. This wall may be formed as part of the container itself by prolonging the length of one of its side walls sufficiently. As shown in Figs. 3 and 4, the sides of the container have their upper ends inwardly bent toward each other forming top strips 7, one of said strips, as above stated, being prolonged and bent downwardly to form what I have termed a partition wall 6. To provide the end supporting flanges 3 (Fig. 1) for the rick, a separate top plate or strap 8 may be secured as by rivets to the top strips 7. the ends of this strap projecting beyond the ends of the container to form the supporting extensions 3.

This partition or wall 6 acts as a closure for the inner ends of a plurality of open ended cell-like metal tubes 9 inserted through the opposite faces of the container, their inner ends resting against the wall 6 and their outer ends being suitably held rigidly to the walls of the container. These tubes, as will be evident, provide a series of cell-like openings similar to the cells of the usual comb structure but composed of metal. As the honey-laden bee enters one of these cells to deposit his burden of honey, he will go in as far as possible to make his deposit. For this reason I have provided each tube 9 at the bottom of its trough and at the end contacting the wall 6, with a honey-draining slot 10 of V shape, the open or wide end of the slot being at the wall end 6 of the tube. The honey which the bee collects and deposits will be at the inner end of the tubes 9 and will drain from these tubes automatically through the V-shaped drain slots 10.

When examination by the bee keeper discloses that one or more of these ricks is substantially filled, it is only necessary to remove the rick or ricks from the super and quickly draining the contents of the rick container therefrom through the draining aperture in its base, replace the rick or ricks in the super.

The construction disclosed and previously referred to, while relatively simple, is of such utility as to eliminate the labor of the bee-keeper and of the bee, as outlined at the beginning of this specification, and by doing this, it increases the honey production by the bee and decreases on the part of the bee-keeper the labor and cost of securing the honey so produced. The novel construction and permanent character of the rick is also a substantial contribution to the advancement of the art.

I claim:

1. A honey-depositing rick for bee-hive supers comprising a thin flat rectangular metal container having a drain opening in its base and a closure member therefor, said container being adapted to be supported in a substantially vertical position in a bee-hive super and provided adjacent to its top with a central transversely extending partition wall, and a plurality of horizontal cell-like open metal tubes extending inwardly to said wall plate from the opposite outer faces of the container and having honey-draining slots therein at their inner ends.

2. A honey-depositing rick for bee-hive supers comprising a container having a honey drain with closure at its bottom and a plurality of opposed cell-like tubes extending inwardly thereof at its top, a partition at the top between said opposed tubes, the latter having honey-draining openings at their inner ends.

3. A honey-depositing rick for bee-hive supers comprising a container having a honey drain opening at its base provided with a closure member, a centrally located internal wall adjacent its top, and a plurality of opposed cell-like tubes extending inwardly from opposite faces of the container with their inner ends closed by said wall and provided with drain openings therein.

4. An all metal rick for bee-hive supers comprising a flat metal container having a bottom drain opening therein provided with a closure member, a transversely partitioned upper portion and a plurality of opposed open-ended self draining tubes extending inwardly to said transverse partition with their inner ends closed thereby.

5. A honey depositing rick for bee-hive supers comprising a container having a bottom drain opening therein provided with a closure member, and having a plurality of cell-like passages at the top, the inner ends of said passages being closed and provided with honey drains communicating with the lower portion of the container.

6. A honey depositing rick for bee-hive supers comprising a container having a honey drain opening in its base provided with a closure member, and having a plurality of inwardly extending cell-like tubes inserted adjacent to its top and having their inner ends closed and with honey-draining slots in their bottoms at such ends.

7. A honey depositing rick for bee-hive supers comprising a container having a honey drain opening in its base provided with a closure member, and having an internal partition wall at its top, a plurality of cell-like tubes in said container at its top having their inner ends closed by said wall with V-shaped honey draining slots at their bases adjacent to said wall.

8. A honey depositing rick for bee-hive supers comprising a container having a honey drain opening in its base provided with a closure member, an internal transversely extending wall at its upper end, said container having a plurality of cell-like passages extending inwardly at said upper end and closed at their inner ends by said wall, said passages having drain slots at such inner ends.

9. A honey depositing rick for bee-hive supers comprising a flat metal container having a honey drain opening in its base provided with a closure member, a central transversely extending partition wall at its upper end, and a plurality of cell-like tubes extending inwardly from opposite sides with their inner ends abutting and closed by said wall, the inner ends of said tubes at their bottoms having V-shaped notches providing honey draining slots.

SAMUEL G. BROYLES.